(12) United States Patent
Foley (10) Patent No.: US 11,686,391 B1
(45) Date of Patent: Jun. 27, 2023

(54) END SEAL WITH SELF-SEALING INSERT

(71) Applicant: AJ Flexo Incorporated, Port Richey, FL (US)

(72) Inventor: Anthony Foley, Tampa, FL (US)

( * ) Notice: Subject to any disclaimer, the term of this patent is extended or adjusted under 35 U.S.C. 154(b) by 0 days.

(21) Appl. No.: 18/061,121

(22) Filed: Dec. 2, 2022

(51) Int. Cl.
*F16J 15/3204* (2016.01)

(52) U.S. Cl.
CPC ................................ *F16J 15/3204* (2013.01)

(58) Field of Classification Search
CPC .... F16J 15/00; F16J 15/16; F16J 15/50; F16J 15/52; F16J 15/32; F16J 15/3204; F16J 15/3208; F16J 15/3212
USPC ........................................................ 277/549
See application file for complete search history.

(56) References Cited

U.S. PATENT DOCUMENTS

| | | |
|---|---|---|
| 9,250,566 B2 | 2/2016 | Foley |
| 9,535,373 B2 | 1/2017 | Foley |
| 2012/0049465 A1* | 3/2012 | Foley ................. B41F 31/027 277/500 |
| 2015/0286161 A1* | 10/2015 | Foley ................. B41F 31/027 399/103 |
| 2016/0147180 A1* | 5/2016 | Foley ................. G03G 15/0817 399/102 |

FOREIGN PATENT DOCUMENTS

| | | | | |
|---|---|---|---|---|
| DE | 42 41 792 | * | 6/1994 | ............ B41F 31/027 |
| DE | 202009013643 | * | 4/2011 | ............ B41F 31/027 |

* cited by examiner

*Primary Examiner* — Nathan Cumar
(74) *Attorney, Agent, or Firm* — Larson & Larson; Justin P. Miller; Frank Liebenow (57) ABSTRACT

The end seal with self-sealing insert includes a flexible, or compressible body, and a stiffer insert to reduce wear caused by the rotating anilox roller. The end seal with self-sealing insert places the recesses within the body beneath an expanded insert. The insert, when under pressure, seals the holes of the body, preventing introduction and accumulation of solvents. The result is a degradation-resistant end seal. By having extensions, also referred to as posts or legs, protruding from the insert that pass into the body, the reliance on adhesives is avoided. The reduction of the use of adhesives is helpful because adhesives are sensitive to solvents used in ink and to cleaning solutions. In the preferred embodiment, circular posts extend downward from the insert, passing into circular holes in the body.

15 Claims, 11 Drawing Sheets

END SEAL WITH SELF-SEALING INSERT

FIELD

This invention relates to the field of printing and more particularly to a seal for use with a flexography printing process.

BACKGROUND

Flexography, or flexo, is a form of printing that uses a flexible relief plate. Flexography is considered the modern evolution of letterpress. This method of printing can be used on almost any type of substrate, including paper, cardboard, plastic, and metal.

One of the main advantages of flexography is the easy setup as compared to other printing methods. Additionally, flexography can be used to print on uneven or curved surfaces, which is difficult for alternative methods of printing such as screen printing.

Flexography relies on the use of an ink chamber in combination with two doctor blades to dispense ink to the anilox roller, carrying ink to the printing plate.

The ends of the ink chamber must be sealed with respect to the rotating anilox roller.

The seals serve as a junction between the rotating anilox roller and the stationary ink chamber, preventing the ink from leaking.

Existing seals have a limited life and are difficult to properly adjust.

What is needed is an ink chamber seal that is easy to adjust, that avoids degradation due to ink and solvent exposure.

SUMMARY

The end seal with self-sealing insert includes a flexible, or compressible body, and a stiffer insert to reduce wear caused by the rotating anilox roller.

The length of the insert is limited to a radius that matches the outside profile of the rotating anilox roller. In the preferred embodiment, the insert has a corresponding upper surface with a radius, the radius of the body matching the radius of the roller. Upon engagement of the seal against the roller, the insert is forced into the body.

Prior art end seals recess the insert into the body. This results in a more complicated assembly arrangement, increasing machining costs and decreasing reliability.

Additionally, recessing the insert into the body creates a reservoir into which the ink and associated chemicals can accumulate, damaging the integrity of the insert and/or the seal body. This often leads to delamination of the insert from the seal caused by adhesive failure. Additionally, accumulation of dried or hardened ink shortens the life of the seal.

The end seal with self-sealing insert places the recesses within the body beneath an expanded insert. The insert, when under pressure, seals the holes in the body, preventing introduction and accumulation of ink and cleaning chemicals. The result is a degradation-resistant end seal.

By having extensions that protrude from the insert and pass into the body, also referred to as posts or legs, the reliance on adhesives is avoided. The reduction of the use of adhesives is helpful because adhesives are sensitive to solvents used in ink.

In the preferred embodiment, circular posts extend downward from the insert, passing into circular holes in the body. The use of circular holes decreases manufacturing cost because a drill press, water-jet, or laser can be used for straightforward and repeatable manufacturing.

Alternative arrangements are anticipated, including using longer slot-type legs, requiring more extensive machine to the body but still creating a self-sealing feature. In such embodiments one or more legs can be used depending on the amount of mechanical connection required between insert and the body. The one or more legs can be oriented parallel or perpendicular to the length of the body.

Additional alternative embodiments include using multiple inserts for a single body. For example, two inserts adjacent to each other across the width of the body, or two inserts in-line with each other along a length of the body.

The insert ramp is shown as curved, or formed with a curved upper surface. In alternative embodiments, the insert ramp is a shape other than to curved, including flat. In such embodiments the insert ramp is preferably formed from a flexible material. In such embodiments, the insert ramp is flat before use, curving under the pressure applied by the anilox roller.

Regarding materials, the body is preferably formed from a resilient material (e.g., about 25-90 Durometer Shore A, more preferably about 30-70 Shore A, and yet more preferably about 50 Shore A) that may be injection molded, compression molded, water-jet cut, laser cut, or mechanically die-cut. Sample materials include thermo-plastic materials or thermoset materials, EPDM rubber, Buna-N rubber, Natural Rubber, SBR Rubber, Viton, Polyethylene foam, ethyl vinyl acetate foam, and SAE Felt. The insert is preferably formed from an abrasion-resistant material such as Teflon (polytetrafluoroethylene—PTFE), a perfluoroalkoxy alkane (PFA), fluorinated ethylene propylene (FEP), strip steel, biaxially-oriented polyethylene terephthalate (BoPET), UHMWPE, or POM (acetal).

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
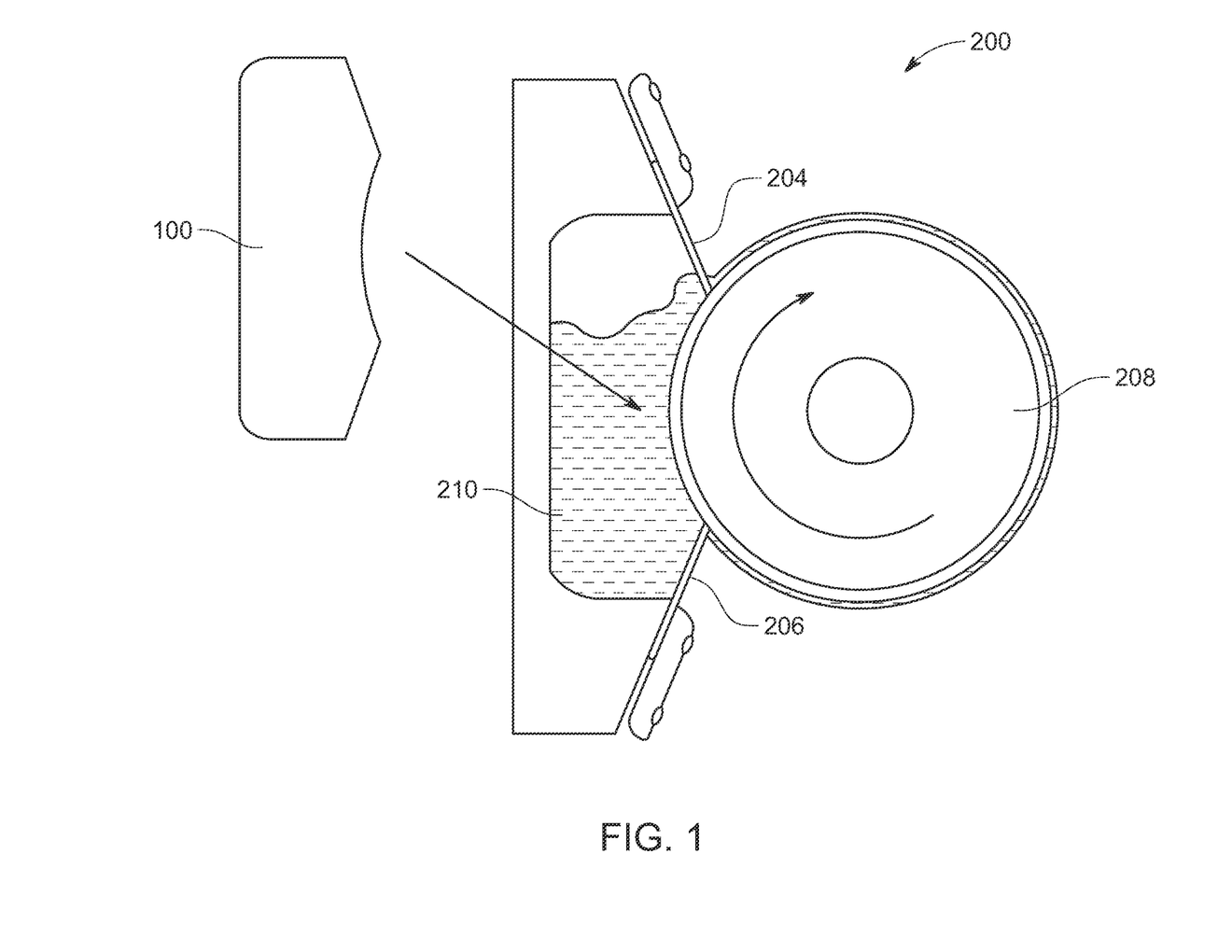
FIG. 1 illustrates an end view of a typical flexography printing machine, showing the location of various blades and the seal.

Referring to FIG. 1, an end view of a typical flexography printing machine, showing the location of various blades and seal, is shown.

A typical doctor blade chamber 200 is shown, including a metering blade 204 and a containment blade 206 that rest against the rotating anilox roller 208. Ink 210 is prevented from leaking by the end seal with self-sealing insert 100.

Figure 2:
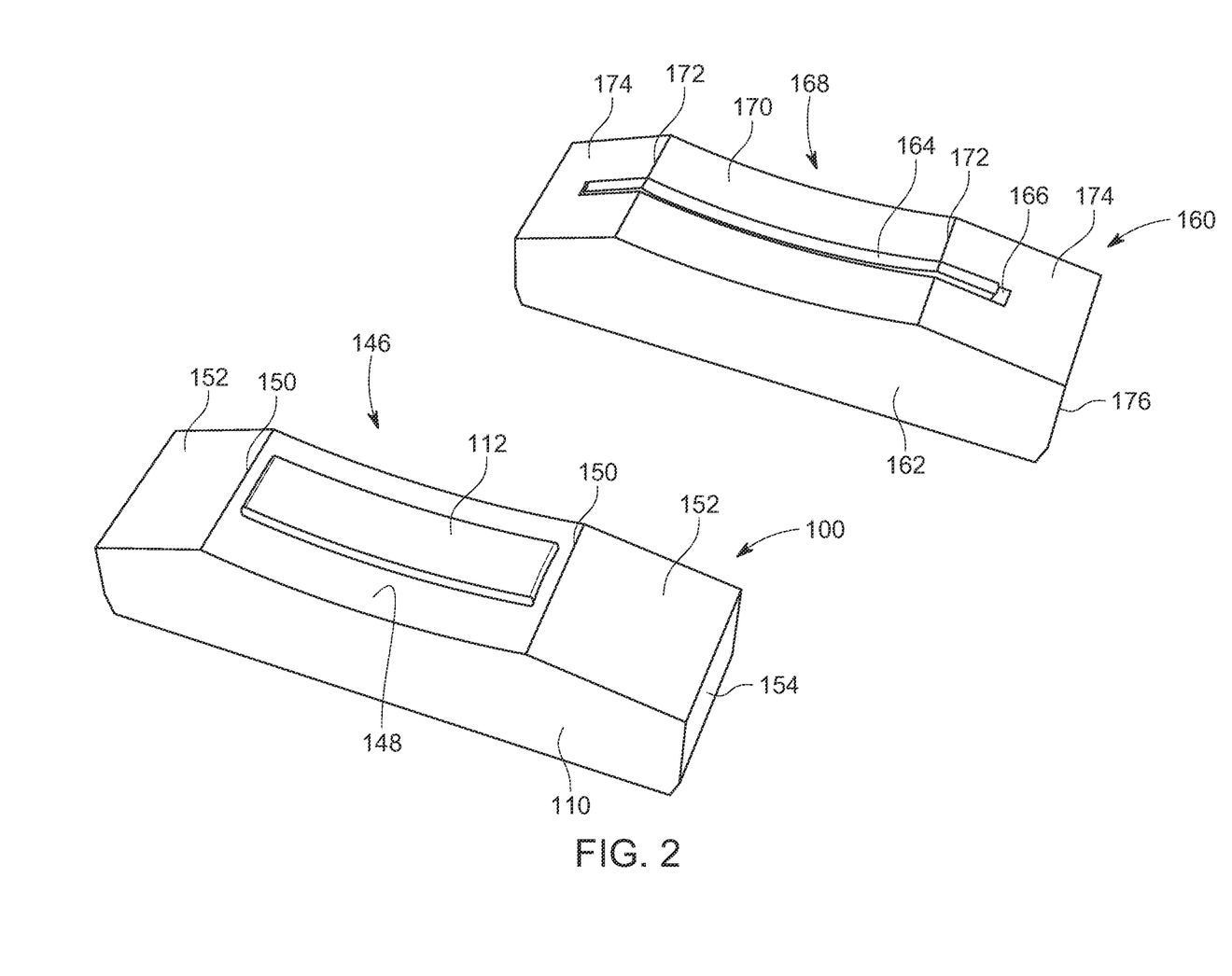
FIG. 2 illustrates an isometric view of an existing seal and the end seal with self-sealing insert.
Figure 3:
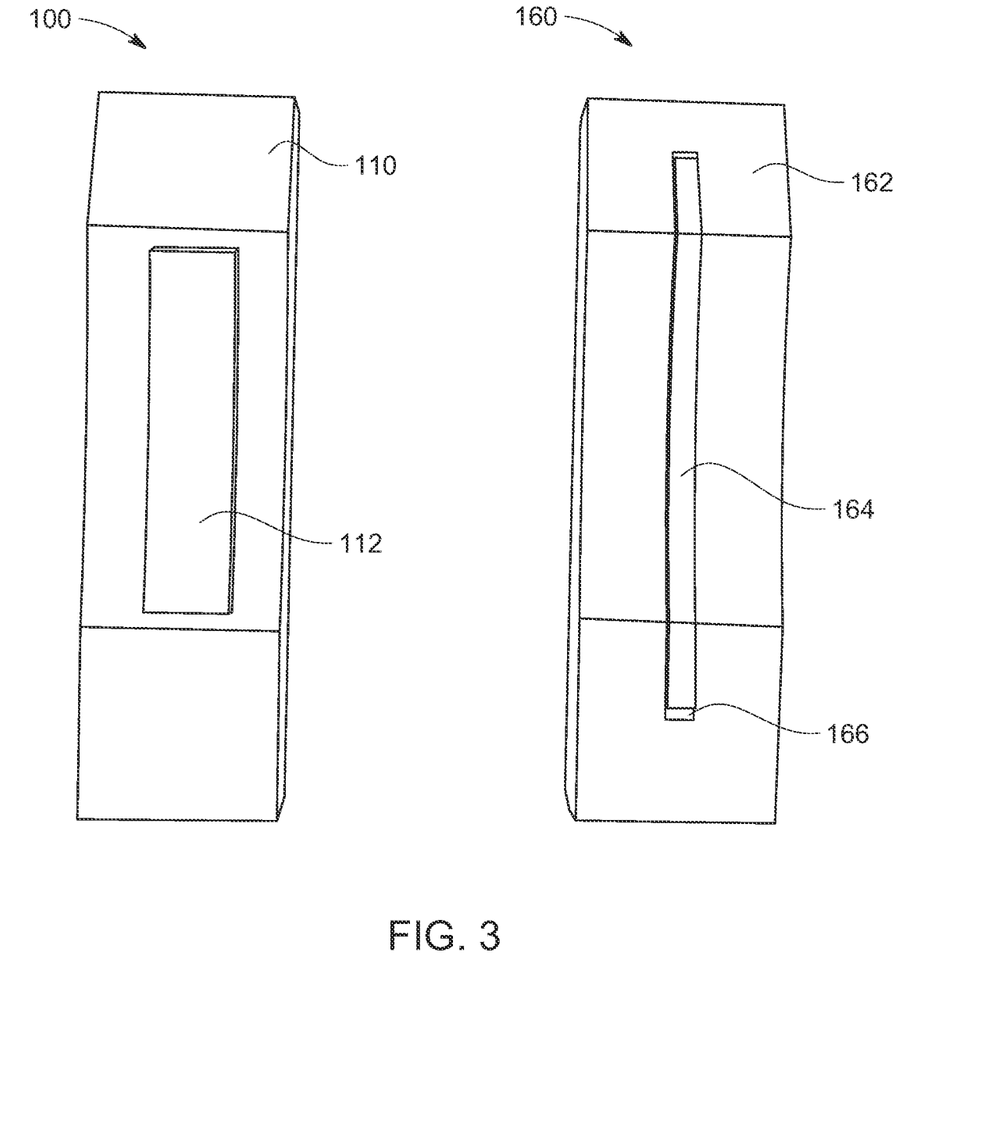
FIG. 3 illustrates a top view of an existing seal and the end seal with self-sealing insert.

Referring to FIGS. 2 and 3, an isometric view and a top view of an existing seal and the end seal with self-sealing insert are shown.

The prior art seal 160 includes a prior art body 162, and a prior art insert 164 that fits within a prior art body recess 166.

The prior art body recess 166 is exposed during use, creating a tendency to accumulate solvent within the prior art body 162.

The prior art body 162 includes a prior art body upper surface 168 formed from a prior art body radius surface 170 and prior art body side wall 174 divided by prior art body radius edges 172.

The ends of the prior art body 162 are referred to as prior art body end walls 176.

The prior art insert 164 extends beyond the prior art body radius surface 170, passing through the prior art body radius edges 172.

In contrast, the end seal with self-sealing insert 100 includes a body 110 with insert 112, the insert 112 covering holes into the body 110.

The body 110 includes an upper body surface 146 formed from a body radius surface 148, divided into body side wall 152 and body end wall 154 by body radius edges 150.

The insert 112 is limited to the area defined by the body radius surface 148, and does not extend past or through the body radius edges 150.

The result is improved sealing of the insert against the body, further acting to exclude inks and cleaning solutions.

Figure 4:
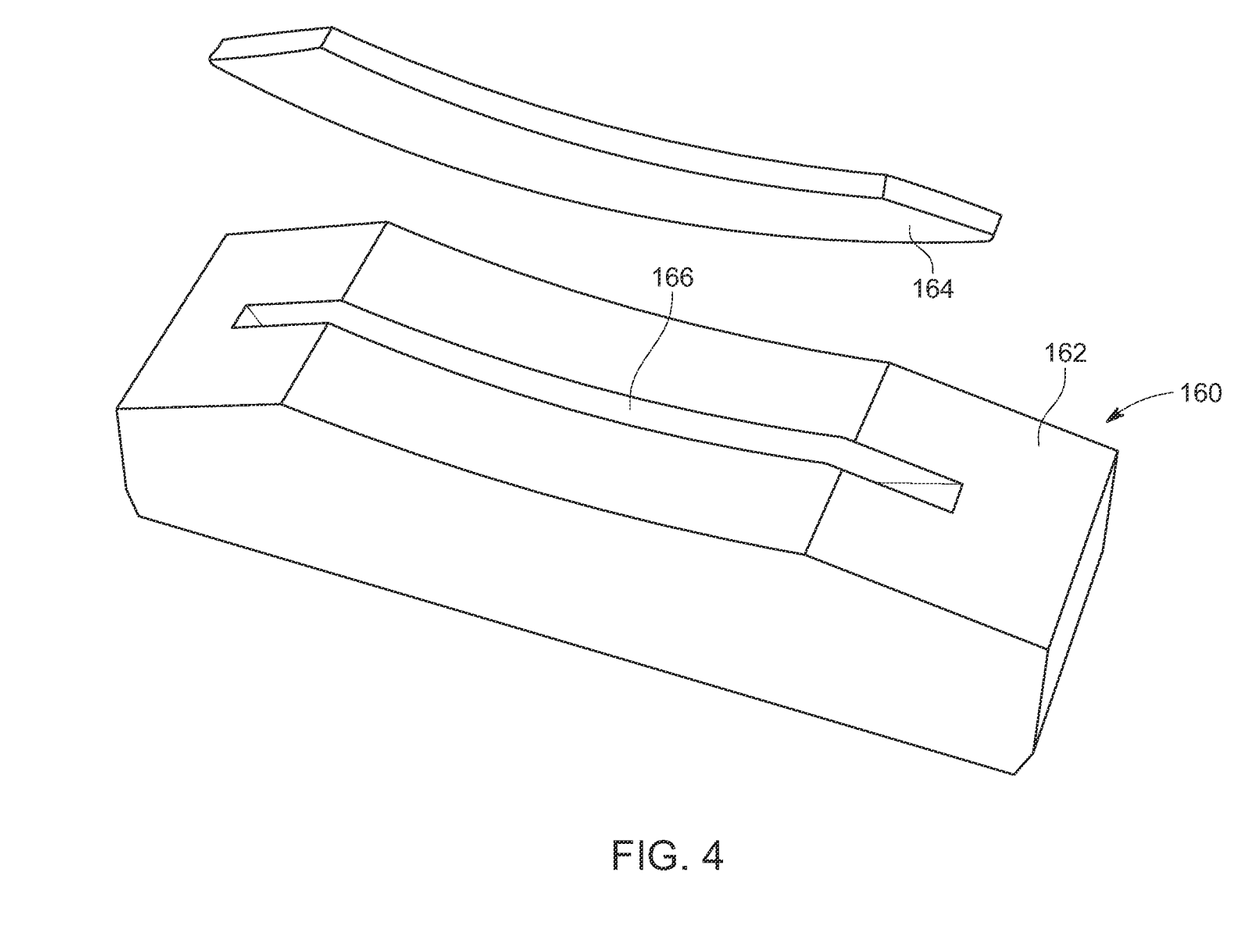
FIG. 4 illustrates an exploded view of the existing seal with an insert and location slot.

Referring to FIG. 4, an exploded view of the existing seal is shown.

In this prior art embodiment, the prior art body recess 166 is a slot, or continuous recess, into which the prior art insert 164 fits. The tendency to accumulate solvents is visible based on the exposure of the prior art body recess 166 during operation of the prior art seal 160.

Figure 5:
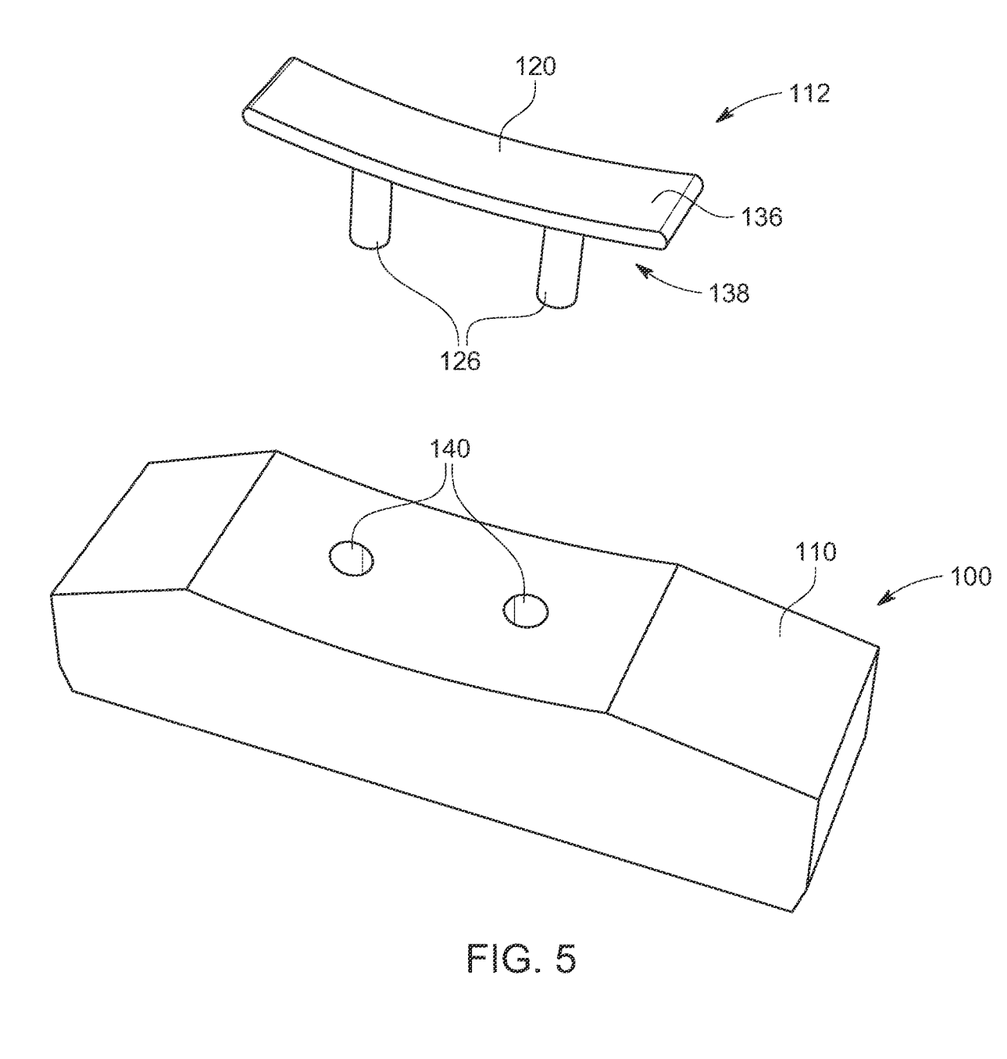
FIG. 5 illustrates an exploded view of the end seal with self-sealing insert.

Referring to FIG. 5, an exploded view of the end seal with self-sealing insert is shown.

The end seal with self-sealing insert 100 is shown formed from body 110 and insert 112.

Insert 112 includes an insert ramp 120, which rests against the anilox roller 208 (see FIG. 1) during operation. The insert ramp 120 further includes insert legs 126, which mate with body recesses 140 of the body 110.

The insert legs 126 are shown as cylinders, mating with cylindrical body recesses or holes 140. This shape is ideal because molding of the insert 120 is simplified, and the body recesses of 140 can be formed with a drill press, water-jet cut, or laser cut.

But other shapes are anticipated. For example, square profiles, triangular profiles, or rectangular/rib-shaped legs 126.

Also shown are the top surface 136 and bottom surface 138 of the insert ramp 120.

Figure 6:
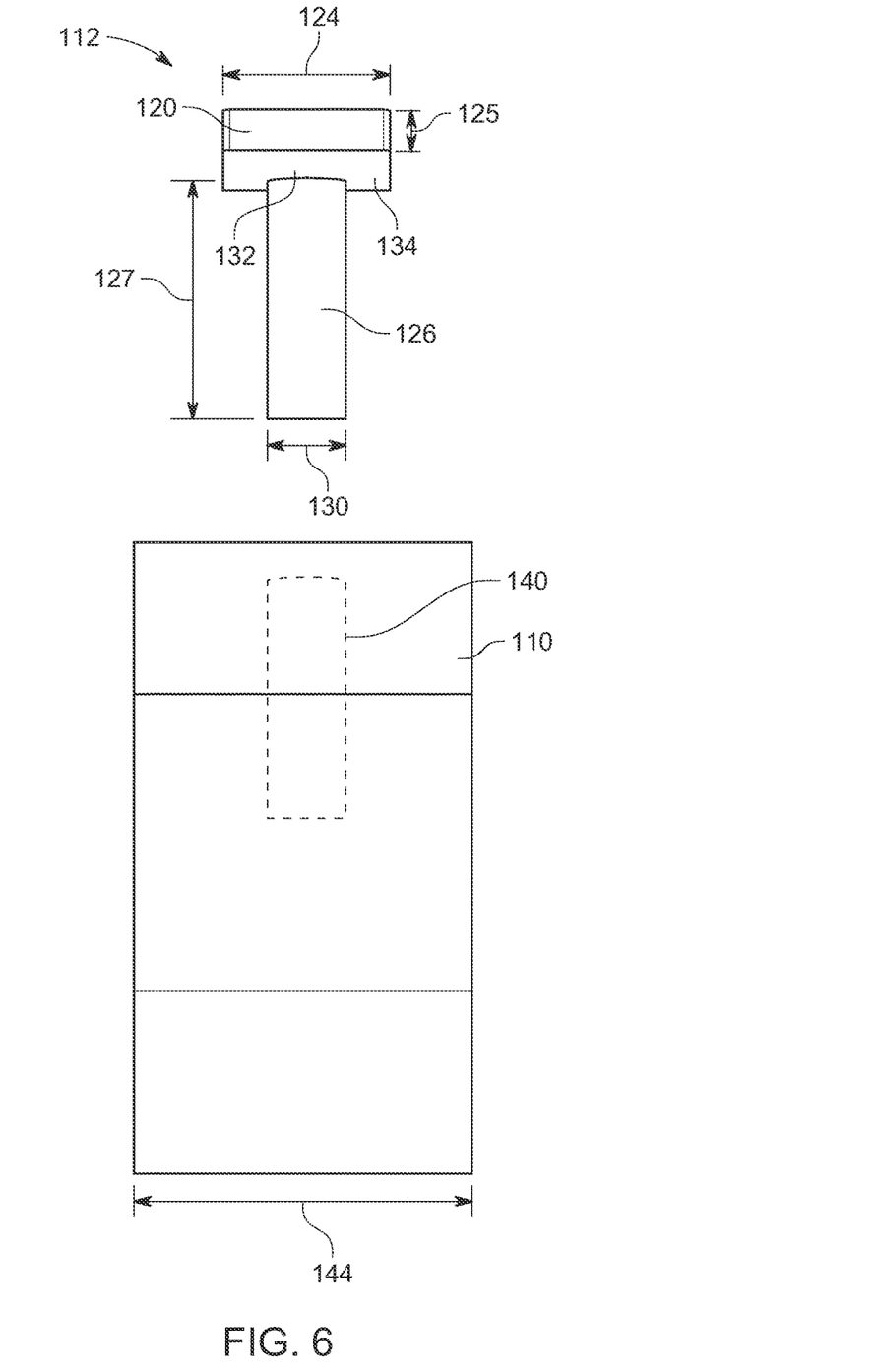
FIG. 6 illustrates an end-on view of the end seal with self-sealing insert.

Referring to FIG. 6, an end-on view of the end seal with self-sealing insert is shown.

The insert ramp 120 has a ramp width 124 and a ramp thickness 125. Each insert leg 126 has a leg height 127 and a leg width 130.

The ramp width 124 is preferably greater than the leg width 130, creating an end overhang 132 and a side overhang 134, allowing the insert ramp 120 to seal against the body 110, in particular because of the increased hardness of the insert ramp 120 as compared to the body 110. The ramp width 124 is less than or equal to the body width 144, ensuring there is material for the insert ramp 120 to seal against of the body no without any overhang beyond the body width 144.

The result is that solvents are prevented from entering and accumulating within the body recess 140, thereby increasing life of the end seal with self-sealing insert 100.

Figure 7:
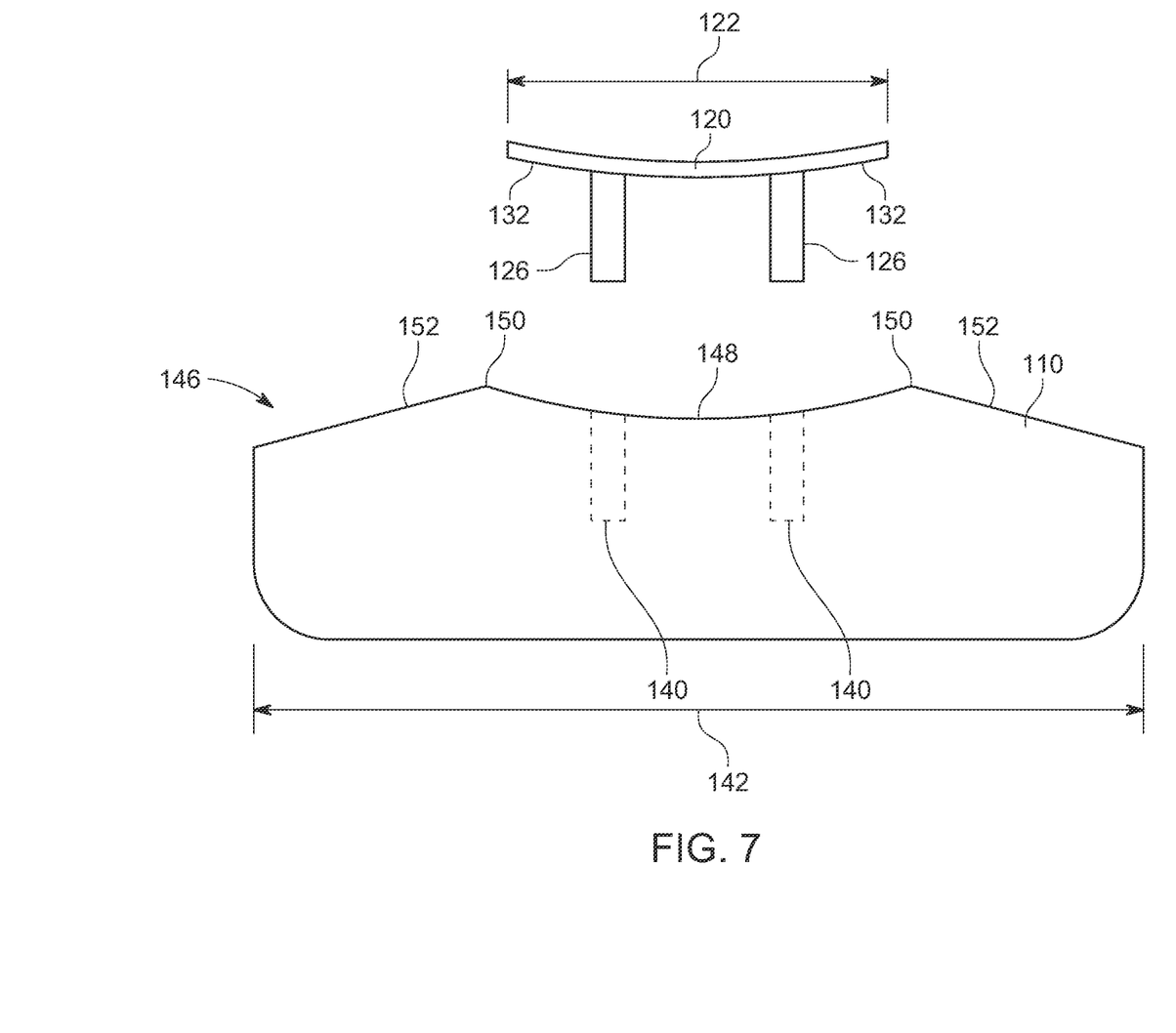
FIG. 7 illustrates a side view of the end seal with self-sealing insert.

Referring to FIG. 7, a side view of the end seal with self-sealing insert is shown.

The insert ramp 120 has a ramp length 122, which is greater than the outside edges of the insert legs 126, leaving end overhangs 132. This creates the benefit of the insert 112 sealing against the body 110, preventing the introduction of solvents into the body recesses 140.

The ramp length 122 is also less than the body length 142, ensuring room for a seal of the insert ramp 120 against the body 110. In this embodiment, the ramp length 122 is also less than the distance between body radius edges 150, allowing the insert ramp 120 to seal against the body 110 between body radius edges 150.

Also shown is an upper body surface 146 formed from a body radius surface 148 and body side walls 152 divided by body radius edges 150.

Figure 8:
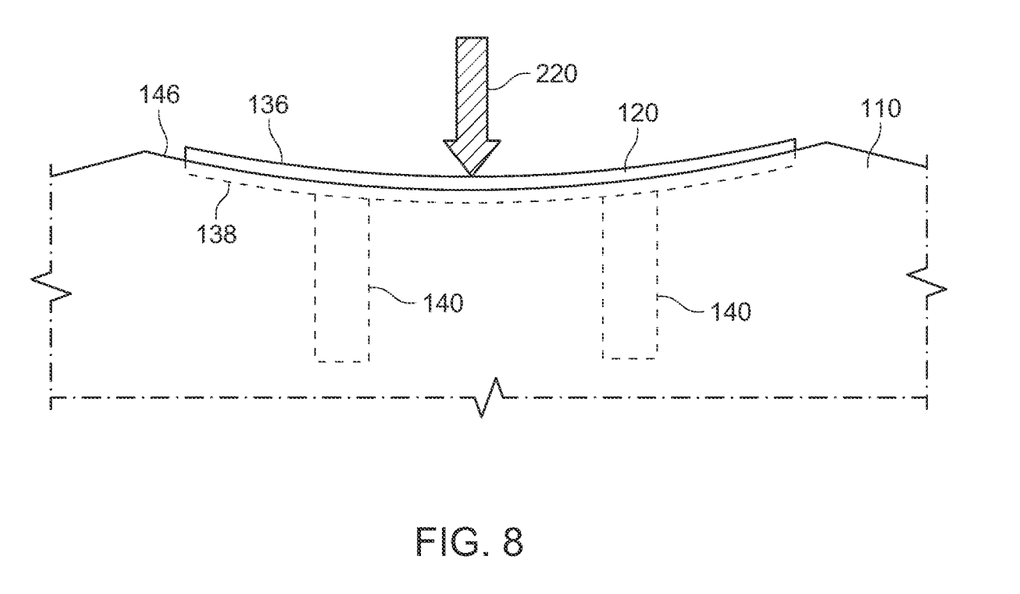
FIG. 8 illustrates a side view of the end seal with self-sealing insert under compression, creating a seal against the body.

Referring to FIG. 8, a side view of the end seal with self-sealing insert under compression, creating a seal against the body, is shown.

A compressive force 220 is applied by, for example the anilox roll 208, against the top surface 136, or face, of the insert ramp 120. The compressive force 220 causes the stiffer insert ramp 120 to deform the body 110, specifically causing the bottom surface 138 of the ramp 120 to seal against the upper body surface 146 of the body 110. As a result, solvents are excluded from the body recesses 140, thereby extending the life of the end seal with self-sealing insert 100.

Figure 9:
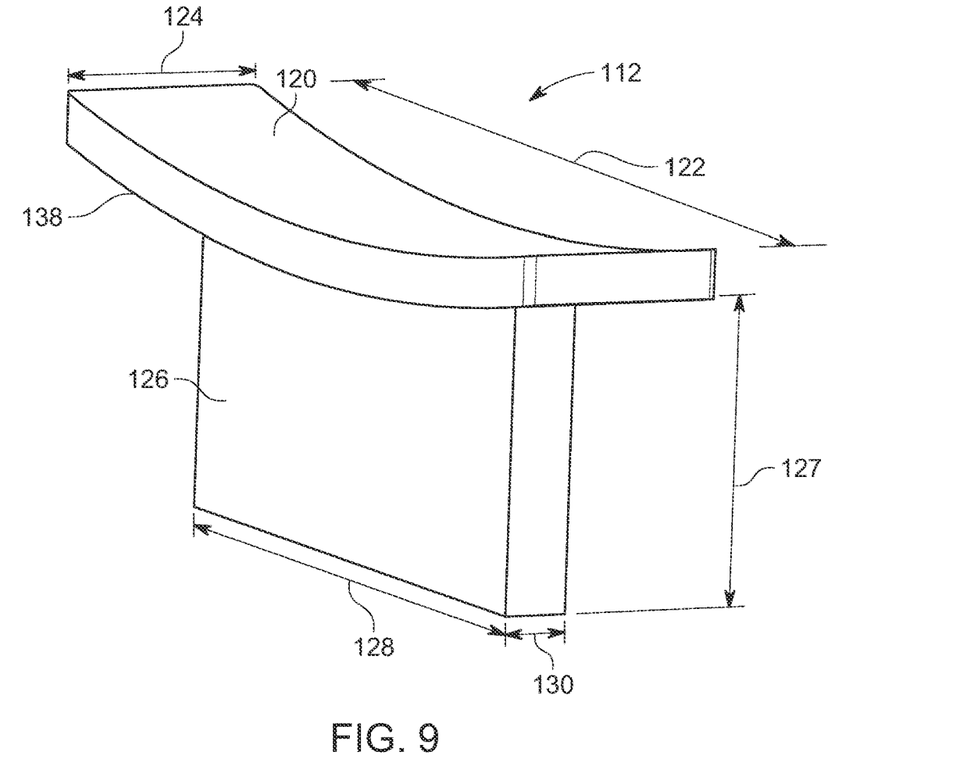
FIG. 9 illustrates an isometric view of a first alternative embodiment of the insert of the end seal with self-sealing insert.
Figure 10:
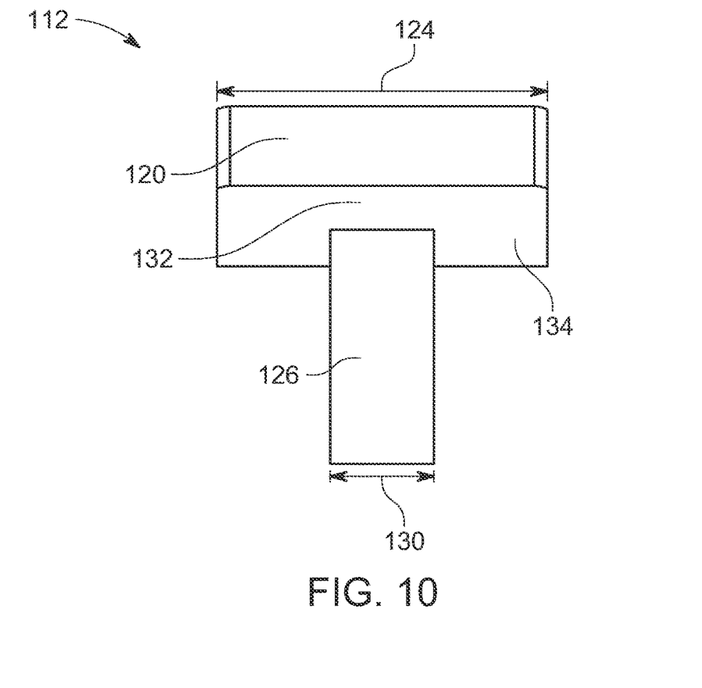
FIG. 10 illustrates an end-on view of a first alternative embodiment of the insert of the end seal with self-sealing insert.

Referring to FIGS. 9 and 10, an isometric view and an end-on view of a first alternative embodiment of the insert of the end seal with self-sealing insert is shown.

In this embodiment, the insert leg 126 is the single leg, or rib, extending along the length of the insert ramp 120. Insert leg length 128 and leg width 130 remain less than ramp length 122 and ramp width 124. Also shown is leg height 127.

These differences in length create an end overhang 132 and a side overhang 134, causing the bottom surface 138 of the insert ramp 120 to seal against the upper body surface 146 (see FIG. 8), preventing solvents from intruding into the body recess 140 (see FIG. 8).

Figure 11:
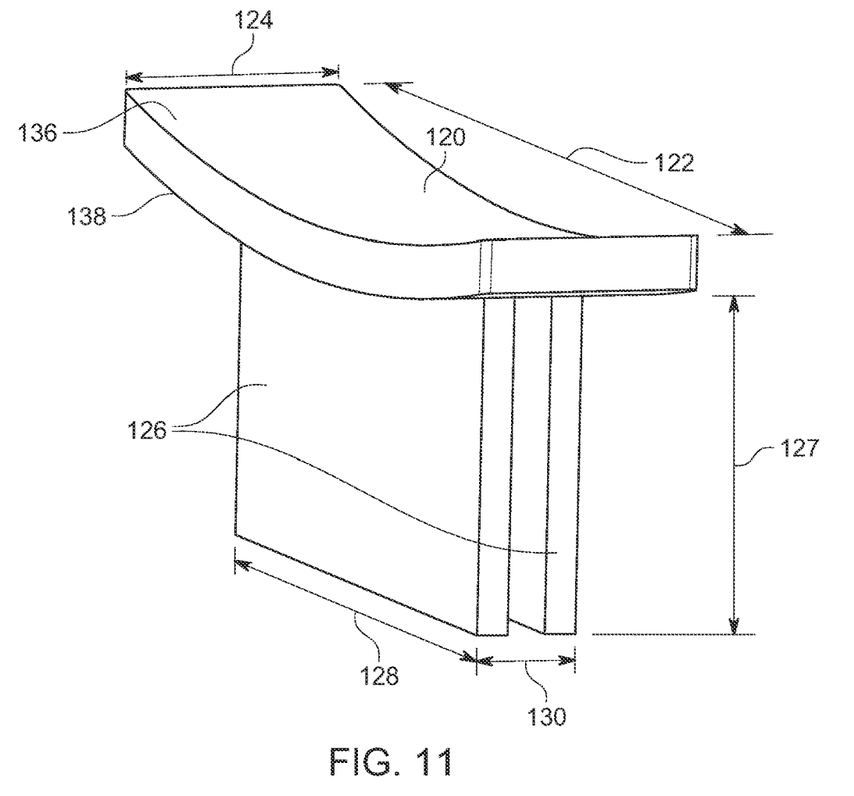
FIG. 11 illustrates an isometric view of a second alternative embodiment of the insert of the end seal with self-sealing insert.
Figure 12:
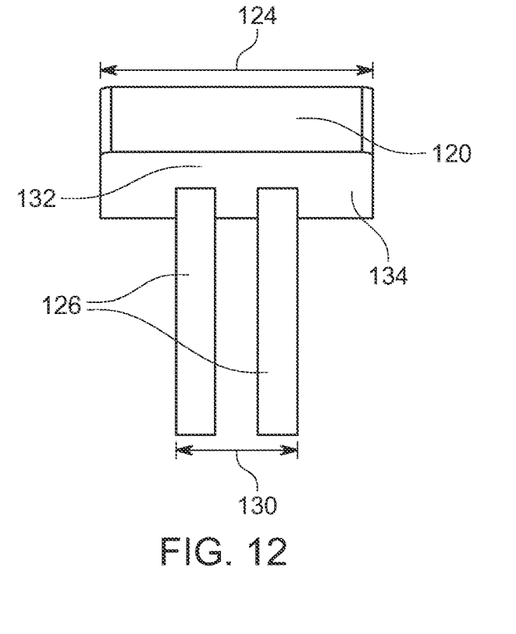
FIG. 12 illustrates an end-on view of a second alternative embodiment of the insert of the end seal with self-sealing insert.

Referring to FIGS. 11 and 12, an isometric and an end-on view of a second alternative embodiment of the insert of the end seal with self-sealing insert is shown.

The insert ramp 120 is again shown with ramp width 124 and ramp length 122. Leg length 128 is less than ramp length 122, and length width 130 is less than ramp width 124. This limitation exists even though insert leg 126 is shown as two parallel insert legs 126. Also shown is leg height 127.

These differences in length create an end overhang 132 and a side overhang 134, causing the bottom surface 138 of the insert ramp 120 to seal against the upper body surface 146 (see FIG. 8), preventing solvents from intruding into the body recess 140 (see FIG. 8).

Figure 13:
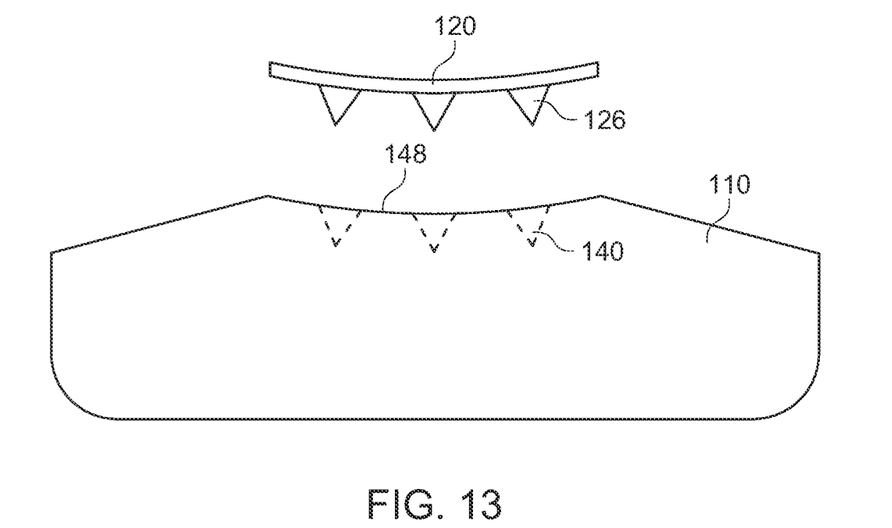
FIG. 13 illustrates a side view of a third alternative embodiment of the insert of the end seal with self-sealing insert.

Referring to FIG. 13, a side view of a third alternative embodiment of the insert of the end seal with self-sealing insert is shown.

The insert ramp 120 is shown with insert legs 126 with the shape of triangles. The insert legs 126 fit into the body recesses 140 shown within the body radius surface 148 of the body 110. In this embodiment, the insert legs 126 have a length perpendicular to that of the insert ramp 120, or as shown in FIG. 13, the length is in-and-out of the figure, or rotated 90 degrees as compared to, for example, FIG. 9.

Figure 14:
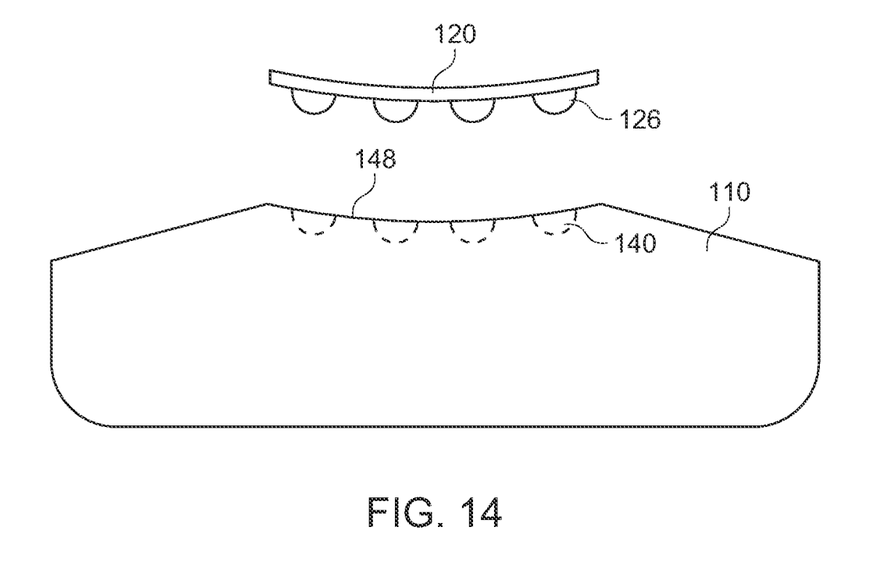
FIG. 14 illustrates a side view of a fourth alternative embodiment of the insert of the end seal with self-sealing insert.

Referring to FIG. 14, a side view of a fourth alternative embodiment of the insert of the end seal with self-sealing insert is shown.

The insert ramp 120 is shown with insert legs 126 with the shape of triangles. The insert legs 126 fit into the body recesses 140 shown within the body radius surface 148 of the body 110.

In this embodiment, the insert legs 126 have a length perpendicular to that of the insert ramp 120, or as shown in FIG. 14, the length is in-and-out of the figure, or rotated 90 degrees as compared to, for example, FIG. 9. Equivalent elements can be substituted for the ones set forth above such that they perform in substantially the same manner in substantially the same way for achieving substantially the same result.

What is claimed is:

1. A degradation-resistant end seal for flexography machine comprising:
   a body;
      the body including a body recess;
   an insert formed from an insert ramp and an insert leg;
      the insert leg protruding from the insert;
      the insert ramp overhanging the insert leg on a front, back, a right, and a left of the insert ramp;
      the insert leg mating with the body recess to connect the body to the insert;
   a second insert leg;
      the insert leg and the second insert leg each being cylindrical;
   a second body recess;
      the body recess and the second body recess being cylindrical holes;
   the insert leg mating with the body recess, and the second insert leg mating with the second body recess, affixing the insert to the body;
   whereby compression of the insert against the body during use causes the insert ramp to seal against the body, preventing intrusion of solvents into the body recess.

2. The degradation-resistant end seal for flexography machine of claim 1, wherein:
   the body includes a curved upper body surface;
   the insert ramp includes a curved bottom ramp surface;
      the curved upper body surface matching the curved bottom ramp surface;
   the curved bottom ramp surface deforming the curved upper body surface during use, ensuring a seal between the insert ramp and the body.

3. The degradation-resistant end seal for flexography machine of claim 1, wherein:
   the insert leg is a rib and the body recess is a slot;
      the rib fitting into the slot, connecting the insert to the body.

4. The degradation-resistant end seal for flexography machine of claim 1, wherein:
   the insert leg is a first rib and a second rib and the body recess is a first slot and a second slot;
      the first rib fits into the first slot and the second rib fits into the second slot, connecting the insert to the body.

5. The degradation-resistant end seal for flexography machine of claim 1, further comprising:
   a body radius surface along an upper face of the body;
      the body radius surface ending at body radius edges;
   the insert ramp being curved to match the body radius surface;
      the insert ramp terminating at or before the body radius edges;
   whereby the insert is limited to the body radius surface that contacts an anilox roller.

6. An end seal for use with a flexography machine, the end seal preventing leakage of ink, the end seal comprising:
   a compressible body;
      the compressible body including a body recess;
   an insert formed from an insert ramp and one or more insert legs;
      the one or more insert legs interfacing with the body recess, mechanically connecting the insert to the compressible body;
      the insert ramp overhanging the one or more insert legs;
   wherein the one or more insert legs is a first insert leg and a second insert leg;
      the first insert leg and the second insert leg each being cylindrical;
      the compressible body including a second body recess;
         the body recess and the second body recess being cylindrical holes;
      the first insert leg mating with the body recess, and the second insert leg mating with the second body recess, affixing the insert to the compressible body;
   whereby ink is excluded from the body recess by the insert ramp sealing against the compressible body during use.

7. The end seal for use with a flexography machine of claim 6, wherein:
   the compressible body includes a curved upper body surface;
   the insert ramp includes a curved bottom ramp surface;
      the curved upper body surface matching the curved bottom ramp surface;
   the curved bottom ramp surface deforming the curved upper body surface during use, ensuring a seal between the insert ramp and the compressible body.

8. The end seal for use with a flexography machine of claim 6, wherein:

the one or more insert legs is a rib and the body recess is a slot;
the rib fitting into the slot, connecting the insert to the compressible body.

9. The end seal for use with a flexography machine of claim 6, wherein:
the one or more insert legs is a first rib and a second rib and the body recess is a first slot and a second slot;
the first rib fits into the first slot and the second rib fits into the second slot, connecting the insert to the compressible body.

10. The end seal for use with a flexography machine of claim 6, further comprising:
a body radius surface along an upper face of the compressible body;
the body radius surface ending at body radius edges;
the insert ramp being curved to match the body radius surface;
the insert ramp terminating at or before the body radius edges;
whereby the insert is limited to the body radius surface that contacts an anilox roller.

11. A flexography chamber end seal comprising:
an insert ramp placed across an upper face of a compressible body;
an insert leg protruding from the insert ramp into a body recess of the compressible body;
the compressible body includes a curved upper body surface;
the insert ramp includes a curved bottom ramp surface;
the curved upper body surface matching the curved bottom ramp surface;
the curved bottom ramp surface deforming the curved upper body surface during use, ensuring a seal between the insert ramp and the compressible body;
whereby the insert ramp excludes ink from leaking into the body recess, thereby preventing degradation of the compressible body.

12. The flexography chamber end seal of claim 11, further comprising:
a second insert leg;
the insert leg and the second insert leg each being cylindrical;
a second body recess;
the body recess and the second body recess being cylindrical holes;
the insert leg mating with the body recess, and the second insert leg mating with the second body recess, affixing the insert ramp to the compressible body.

13. The flexography chamber end seal of claim 11, wherein:
the insert leg is a rib and the body recess is a slot;
the rib fitting into the slot, connecting the insert to the compressible body.

14. The flexography chamber end seal of claim 11, wherein:
the insert leg is a first rib and a second rib and the body recess is a first slot and a second slot;
the first rib fits into the first slot and the second rib fits into the second slot, connecting the insert ramp to the compressible body.

15. The flexography chamber end seal of claim 11, further comprising:
a body radius surface along an upper face of the compressible body;
the body radius surface ending at body radius edges;
the insert ramp being curved to match the body radius surface;
the insert ramp terminating at or before the body radius edges;
whereby the insert ramp is limited to the body radius surface that contacts an anilox roller.

* * * * *